No. 760,285. PATENTED MAY 17, 1904.
H. WATKINS & W. A. MENGE.
VEHICLE WHEEL.
APPLICATION FILED MAR. 7, 1904.
NO MODEL.
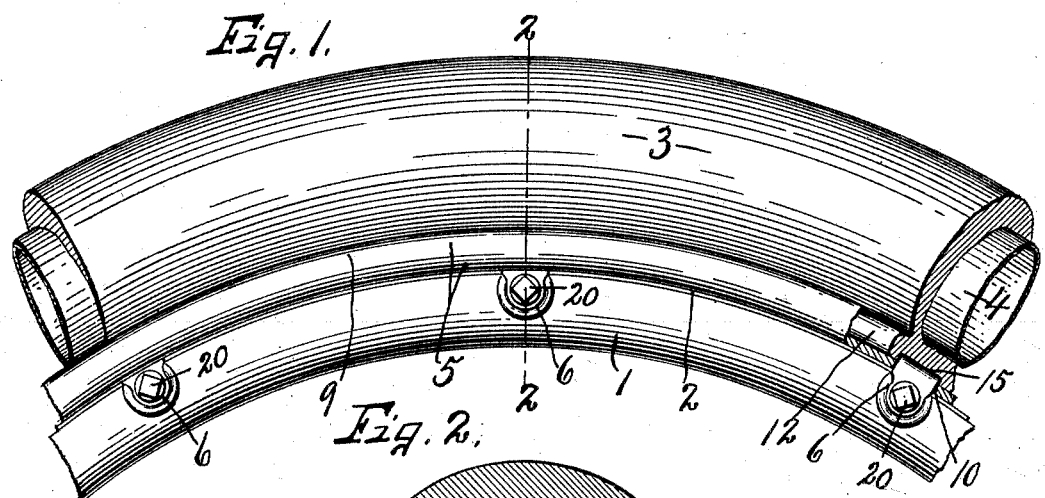
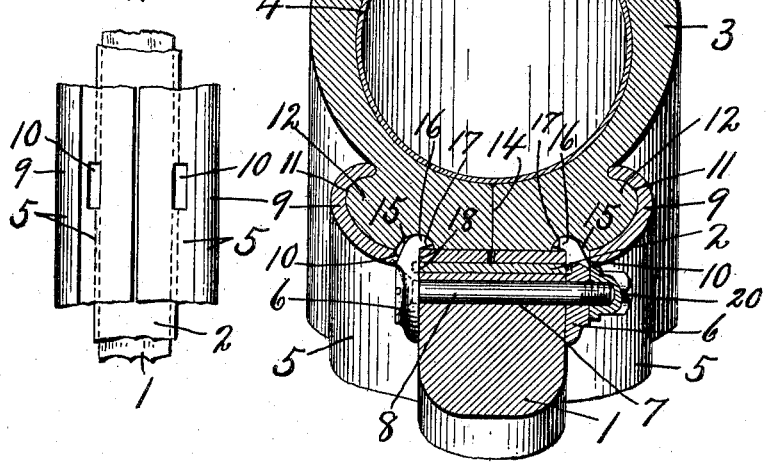
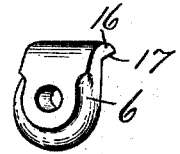
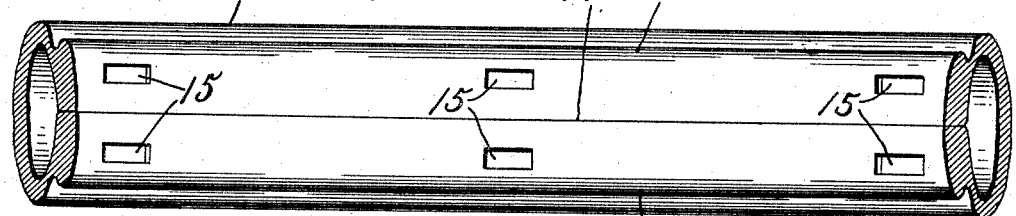
Witnesses:
F. C. Arthur
H. E. Chase
Inventors.
Harry Watkins and
William A. Menge
By Howard P. Denison
Attorney.

No. 760,285. Patented May 17, 1904.

UNITED STATES PATENT OFFICE.

HARRY WATKINS AND WILLIAM A. MENGE, OF UTICA, NEW YORK.

VEHICLE-WHEEL.

SPECIFICATION forming part of Letters Patent No. 760,285, dated May 17, 1904.

Application filed March 7, 1904. Serial No. 196,999. (No model.)

*To all whom it may concern:*

Be it known that we, HARRY WATKINS and WILLIAM A. MENGE, of Utica, in the county of Oneida, in the State of New York, have invented new and useful Improvements in Vehicle-Wheels, of which the following, taken in connection with the accompanying drawings, is a full, clear, and exact description.

This invention relates to improvements in vehicle-wheels, and refers more particularly to double-tube pneumatic tires and to the means for clamping the tire to the felly or rim of the wheel. In this class of wheels the tire is usually composed of an inner inflatable tube and an outer tubular tread, which incloses the inner tube and is split circumferentially through its inner side, so that meeting edges may be sprung apart to permit the insertion and removal of the inner tube.

The object of our present invention is to provide a simple and practical means for clamping the tire to the felly or rim of a wheel, so that it may be readily and easily placed in operative position or removed when desired.

Other objects and uses will appear in the following description.

In the drawings, Figure 1 is an elevation of a portion of a wheel, showing the tire secured to the felly. Fig. 2 is an enlarged sectional view taken on line 2 2, Fig. 1. Fig. 3 is an inner face view of a portion of the outer tire-section. Fig. 4 is an outer face view of portions of the tire-gripping sections. Fig. 5 is a perspective view of one of the clamps for securing one of the tire-gripping sections to the felly.

Similar reference characters indicate corresponding parts in all the views.

The wheel comprises, essentially, a felly 1, a metal band 2, outer and inner tubular tire-sections 3 and 4, tire-gripping sections 5, and clamps or fastening members 6 for securing the gripping-sections 5 to the felly.

The felly 1 may be of any desired form or size; but it is preferably formed of wood and is provided with a series of transverse apertures 7 at regular intervals throughout its circumference for receiving suitable clamping-bolts 8, which secure the clamps 6 to the felly.

The metal band 2 encircles the periphery of the felly, and although it is held in place by the clamps 6 it may be permanently secured to the felly by any other suitable fastening means to form a convenient and durable seat for the gripping members 5. These gripping members preferably consist of separate annular sheet-metal rings, which are seated and closely fit upon the periphery of the band 2 and are provided with opposed tire-gripping flanges 9 and with a series of elongated apertures 10.

The inner parts of the tire-gripping sections are substantially flat and horizontal or parallel with the axis of the wheel, so as to give a broad flat bearing on the band 2 and meet at or near the transverse center of said band, while their outer edges extend beyond the opposite side face of the felly and band and are rolled or bent outwardly and transversely toward each other to form annular grooves 11 in their adjacent faces to receive ribs 12 on the outer tire-section 3.

The apertures 10 are formed in the flat portions of the tire-gripping sections 5 and when assembled are in substantially the same planes as the opposite sides or faces of the felly 1 and band 2 and are disposed in radial lines from the center of the wheel through the apertures 7 in the felly.

The outer tire-section 3 consists of a hollow rubber tube which is split circumferentially at 14 through its inner side, so that its meeting edges may be sprung apart to permit the insertion and removal of the inner inflatable tube 4 when desired, the meeting edges of said tire-section 3 being in a plane substantially coincident with the meeting edges of the gripping-sections 5 when the ribs 12 are seated in the grooves 11, and the inner face of this tire-section 3 is formed with a series of recesses 15, which are registered with the apertures 10 of the tire-gripping sections 5 and receive the outer ends of the clamps 6 to hold the tire from circumferential movement relative to the felly.

The clamping members 6 preferably consist of cast-metal plates, which are arranged in pairs against the side faces of the felly 1 and band 2, one pair for each of the apertures 7 in the felly, and those of each pair are provided with suitable bolt-openings, which are registered with the apertures 7 and receive the bolts 8. The outer ends of these clamps 6 project beyond the periphery of the band 2 through the apertures 10 and into the recesses 15 and are made to closely fit in said apertures and recesses, so as to hold the tire-gripping sections 5 and tire from circumferential or lateral displacement relative to the felly, said outer ends being also offset laterally as inwardly toward each other at 16 and overhanging the adjacent portions of the tire-gripping members 5. The inner faces of these offset portions 16 are beveled at 17 and engage the adjacent sides of the apertures 10 and also the periphery of the tire-gripping sections to draw said sections tightly against the periphery of the band 2 when the bolts 8 are tightened, thereby establishing a firm grip on the sections 5 and at the same time drawing said sections into closer engagement with the ribs of the tire-section 3.

The edges of the band 2 may be recessed at intervals at 18 in registration with the apertures 10 to receive the portions of the clamps 6, which in such case operate to lock the band from circumferential movement on the felly.

In the operation of assembling the parts of the wheel the meeting edges of the outer tire-section are sprung apart and the inner tube 4 inserted therein, after which the whole tire is then placed around the band 2, which has been previously placed upon the felly. The gripping-sections 5 are then placed in operative position from opposite sides of the tire with their flat portions inserted between and against the adjacent faces of the tire-section 3 and felly 1 until the flanges 9 are interlocked with the ribs 12, at which time the meeting edges of the sections 5 closely approach each other. The offset ends of the clamps 6 are then inserted through the apertures 10 and into the recesses 15, and the bolts 8 are then placed in position and drawn tightly by nuts 20, thereby completing the operation of assembling, it being understood that the clamps 6 are tilted inwardly when being inserted into the apertures 10 and before the sections 5 are brought to their operative positions.

In disassembling the parts the order of assembling is simply reversed.

Having thus described our invention, what we claim, and desire to secure by Letters Patent, is—

1. In a vehicle-wheel, the combination with a felly, a tire encircling the felly, opposed tire-gripping sections inserted between the tire and felly from opposite sides and meeting near the transverse center of the felly, and opposed clamps secured to the felly and engaging said gripping-sections.

2. In a vehicle-wheel, the combination with a felly, a hollow tire split circumferentially through its inner wall and surrounding the felly, tire-gripping sections inserted from opposite sides between the tire and felly and meeting in line with the circumferential split of tire, and clamps secured to the felly and engaging the gripping-sections to hold them in place.

3. In a vehicle-wheel, the combination with a felly, a tire encircling the felly, tire-gripping sections inserted between the felly and tire and having apertures therein, and clamps secured to the felly and projecting through the apertures for securing the gripping-sections in place.

4. In a vehicle-wheel, the combination with a felly, a tire encircling the felly, and provided with annular ribs, gripping-sections inserted from opposite sides between the tire and felly and formed with annular grooves and apertures, the grooves receiving the ribs of the tire, and clamps secured to the felly and projecting through the apertures and interlocked with the gripping-sections.

5. In a vehicle-wheel, the combination with a felly and a hollow tire split circumferentially through its inner side, of opposed annular gripping-sections inserted from opposite sides between the felly and tire to draw the meeting edges of the tire together, each gripping-section having series of apertures therethrough, and opposed clamps secured to the felly and projecting through said apertures and having their outer ends projecting laterally from the apertures.

6. In a vehicle-wheel, the combination with a felly, a tire encircling the felly, and provided with recesses in its inner face, opposed tire-gripping sections between the felly and tire and provided with apertures registered with the recesses in the tire, and clamps secured to the felly and projecting through said apertures and into said recesses to lock the gripping-sections to the felly and to hold the tire from circumferential movement relative to the felly.

7. In a vehicle-wheel, the combination with a felly and a hollow tire split circumferentially through its inner side, and provided with recesses in its inner face, tire-gripping sections inserted from opposite sides between the felly and tire and meeting in a plane substantially coincident with the split in the tire, each section having an aperture registered with a recess in the tire, and clamps secured to the felly and projecting through the apertures into the recesses.

8. In a vehicle-wheel, the combination with a felly, a metal band encircling the felly, annular tire-gripping sections resting on the periphery of the band, each section having a series of apertures, a hollow tire split circumferentially through its inner side and provided with recesses in its inner face, and clamps secured to the felly, and projecting through the apertures into the recesses, the outer ends of the clamps being offset laterally and beveled to engage the gripping-sections and draw the same inwardly and toward each other as the clamps are tightened.

In witness whereof we have hereunto set our hands this 2d day of March, 1904.

HARRY WATKINS.
WILLIAM A. MENGE.

Witnesses:
GEO. H. STEVENER,
CHAS. F. MENGE.